(12) United States Patent
Satran et al.

(10) Patent No.: US 7,234,900 B2
(45) Date of Patent: *Jun. 26, 2007

(54) MILLING CUTTING INSERT AND MILLING CUTTER

(75) Inventors: Amir Satran, Kfar Vradim (IL); Danny Chen, Nahariya (IL)

(73) Assignee: Iscar Ltd., Tefen (IL)

( * ) Notice: Subject to any disclaimer, the term of this patent is extended or adjusted under 35 U.S.C. 154(b) by 56 days.

This patent is subject to a terminal disclaimer.

(21) Appl. No.: 11/423,603

(22) Filed: Jun. 12, 2006

(65) Prior Publication Data
US 2006/0222466 A1    Oct. 5, 2006

Related U.S. Application Data

(63) Continuation of application No. 11/240,415, filed on Oct. 3, 2005, now Pat. No. 7,077,605.

(30) Foreign Application Priority Data
Nov. 18, 2004   (IL) .................................... 165294

(51) Int. Cl.
B23C 5/20    (2006.01)
(52) U.S. Cl. .................................. 407/113; 407/114
(58) Field of Classification Search ............... 407/113, 407/114, 115, 116, 117
See application file for complete search history.

(56) References Cited

U.S. PATENT DOCUMENTS

| 3,811,163 | A |   | 5/1974  | Frederick et al. |
| 4,898,499 | A |   | 2/1990  | Tsujimura et al. |
| 4,993,892 | A | * | 2/1991  | Takahashi .................... 407/114 |
| 5,067,858 | A | * | 11/1991 | Cook .......................... 407/114 |
| 5,145,295 | A | * | 9/1992  | Satran ........................ 407/113 |
| 5,314,269 | A | * | 5/1994  | Arai et al. ................... 407/42 |
| 5,388,932 | A | * | 2/1995  | DeRoche et al. ........... 407/113 |
| 5,454,670 | A | * | 10/1995 | Noda et al. .................. 407/42 |
| 5,542,795 | A |   | 8/1996  | Mitchell |
| 5,810,519 | A | * | 9/1998  | Vogel et al. ................ 407/114 |
| 6,056,485 | A |   | 5/2000  | Magill et al. |
| 6,168,355 | B1|   | 1/2001  | Wardell |
| 6,273,650 | B1|   | 8/2001  | Jordberg |
| 6,273,651 | B1| * | 8/2001  | Heinloth et al. ............ 407/116 |

(Continued)

FOREIGN PATENT DOCUMENTS

DE    9320449    7/1994

(Continued)

OTHER PUBLICATIONS

International Search Report, PCT/IL2005/001148, dated Mar. 23, 2006 (corresponds to parent application U.S. Appl. No. 11/240,415 filed Oct. 3, 2005).

*Primary Examiner*—Willmon Fridie, Jr.
(74) *Attorney, Agent, or Firm*—Womble Carlyle

(57) ABSTRACT

A shank of a milling cutter can be somewhat elastic. As a result, during plunging down into a workpiece the milling cutter will not plunge in a true axially downward direction and will form a slanted wall in the workpiece. A milling cutting insert is provided which is capable of "straightening out" the slanted wall. The cutting insert has a rear cutting edge which removes material when the milling cutter is moved axially upwardly.

21 Claims, 2 Drawing Sheets

U.S. PATENT DOCUMENTS

| | | |
|---|---|---|
| 6,340,274 B1 | 1/2002 | Shimomura et al. |
| 6,450,738 B1 * | 9/2002 | Ripley .................. 407/35 |
| 6,595,727 B2 * | 7/2003 | Arvidsson ................ 407/35 |
| 2002/0085887 A1 | 7/2002 | Schneider et al. |

FOREIGN PATENT DOCUMENTS

| | | |
|---|---|---|
| DE | 10052963 | 5/2002 |
| DE | 10336616 | 5/2004 |

* cited by examiner

US 7,234,900 B2

MILLING CUTTING INSERT AND MILLING CUTTER

RELATED APPLICATIONS

This is a Continuation of U.S. patent application Ser. No. 11/240,415, filed Oct. 3, 2005, now U.S. Pat. No. 7,077,605, The contents of the above-identified application are incorporated by reference in their entirety.

FIELD OF THE INVENTION

The present invention relates to a milling cutting insert and a milling cutter for use in plunge milling operations.

BACKGROUND OF THE INVENTION

When plunge milling along an edge, or along the walls of a pre-existing pocket or cavity of a workpiece, a milling cutter is subjected to unbalanced radial cutting forces which tend to deflect the milling cutter away from the workpiece. This phenomenon is particularly problematic during deep plunging in which the milling cutter has a long shank, or a long extension shank.

Long shanks tend to be somewhat elastic so that during deep plunging the unbalanced radial cutting forces cause the shank to bend. The deeper the plunging, the greater the bending of the shank. As a consequence, the milling cutter will not plunge in a true axially downward direction, and a resulting milled portion of a surface of the workpiece will be slanted. This is a disadvantage if a true vertical surface is required.

SUMMARY OF THE INVENTION

In accordance with one aspect of the present invention there is provided a milling cutting insert comprising a pair of opposing end surfaces (12), a pair of opposing minor surfaces (14) and a pair of opposing major surfaces (16). Each end surface (12) and major surface (16) intersect at a major edge (20), at least a portion of which forms a major cutting edge (30), and each end surface (12) and minor surface (14) intersect at a minor edge (32), at least a first portion of which forms a minor cutting edge (36) and at least a second portion of which forms a rear cutting edge (44). Each rear cutting edge (44) merges with and is transverse to an adjacent minor cutting edge (36); each rear cutting edge (44) has a rear relief face (48) that extends towards an opposite end surface (12); each rear cutting edge (44) has a rear rake face (50) that extends along the associated end surface (12); and in a top view of the cutting insert (10), one rear cutting edge (44) of each end surface (12) is not obscured by any part of the cutting insert (10).

Preferably, each end surface has a 180° rotational symmetry about a first axis that passes through the end surfaces. Further preferably, each minor surface has a 180° rotational symmetry about a second axis that is perpendicular to the first axis and passes through the minor surfaces. Yet further preferably, each major surface has a 180° rotational symmetry about a third axis that is perpendicular to both the first and second axes and passes through the major surfaces.

In accordance with another aspect of the present invention there is provided a milling cutting insert comprising a pair of opposing end surfaces (12), a pair of opposing minor surfaces (14) and a pair of opposing major surfaces (16). Each end surface (12) and major surface (16) intersect at a major edge (20), at least a portion of which forms a major cutting edge (30), and each end surface (12) and minor surface (14) intersect at a minor edge (32), at least a portion of which forms a minor cutting edge (36). A first axis (A) passes through the two end surfaces (12), a second axis (B) perpendicular to the first axis (A) passes through the two minor surfaces (14) and a third axis (C) perpendicular to the first and second axes (A, B) passes through the two major surfaces (16), the first and third axes (A, C) define a first plane (P1), and the second and third axes (B, C) define a second plane (P2). An intersection between each end surface (12) and each minor surface (14) also forms a rear edge (34) that extends towards an adjacent major edge (20), at least a portion of the rear edge (34) constitutes a rear cutting edge (44) which merges with the minor cutting edge (36) and extends therefrom towards the first plane (P1) in the general direction of the second axis (B). The rear cutting edge (44) has a rear relief face (48) which extends away from the rear cutting edge (44) towards the second plane (P2); the rear cutting edge (44) has a rear rake face (50) which extends away from the rear cutting edge (44) along a portion of its associated end surface (12); and in a top view of the cutting insert (10), one rear cutting edge (44) of each end surface (12) is not obscured by any part of the cutting insert (10).

Preferably, each end surface has a 180° rotational symmetry about the first axis. Further preferably, each minor surface has a 180° rotational symmetry about the second axis. Yet further preferably, each major surface has a 180° rotational symmetry about the third axis.

There is also provided in accordance with the present invention, a milling cutter comprising a cutter body having a forward end, a rear end, a peripheral surface and an axis of rotation extending between the forward and rear ends and defining a direction of rotation; and a plurality of insert pockets formed on the forward end and opening out to the peripheral surface of the cutter body, each insert pocket retaining a cutting insert in accordance with the present invention.

The cutting insert is retained so that one of its major surfaces faces generally rearwardly, an operative end surface faces generally in the direction of rotation and an operative rear cutting edge, associated with the operative end surface, projects radially outwardly beyond the peripheral surface.

Typically, the operative rear cutting edge extends radially outwardly beyond any portion of the milling cutter.

BRIEF DESCRIPTION OF THE DRAWINGS

For a better understanding of the present invention and to show how the same may be carried out in practice, reference will now be made to the accompanying drawings, in which.

DETAILED DESCRIPTION OF A PREFERRED EMBODIMENT

Figure 1:
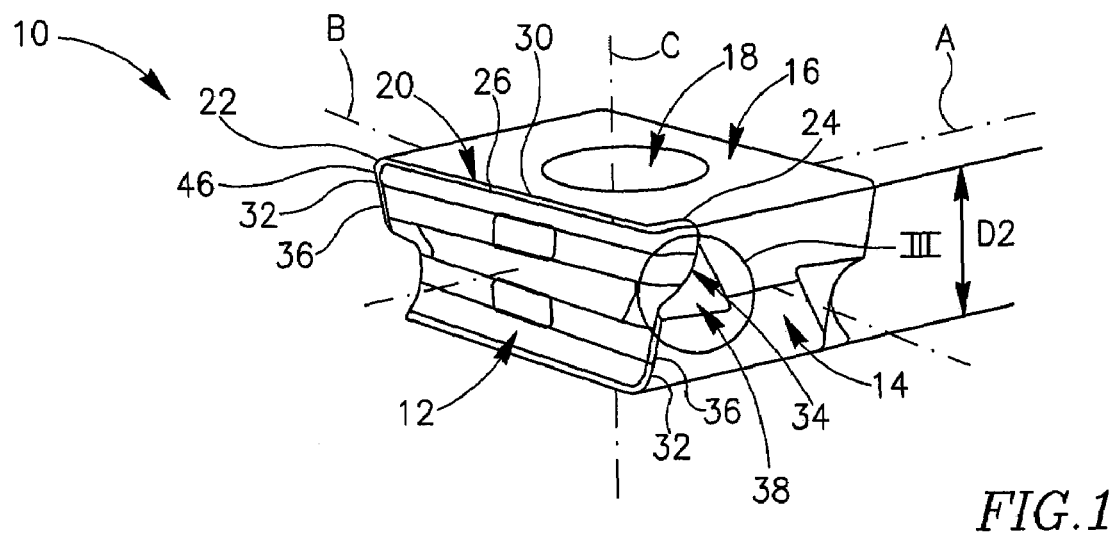
FIG. 1 is a perspective view of a milling cutting insert in accordance with the present invention.
Figure 2:
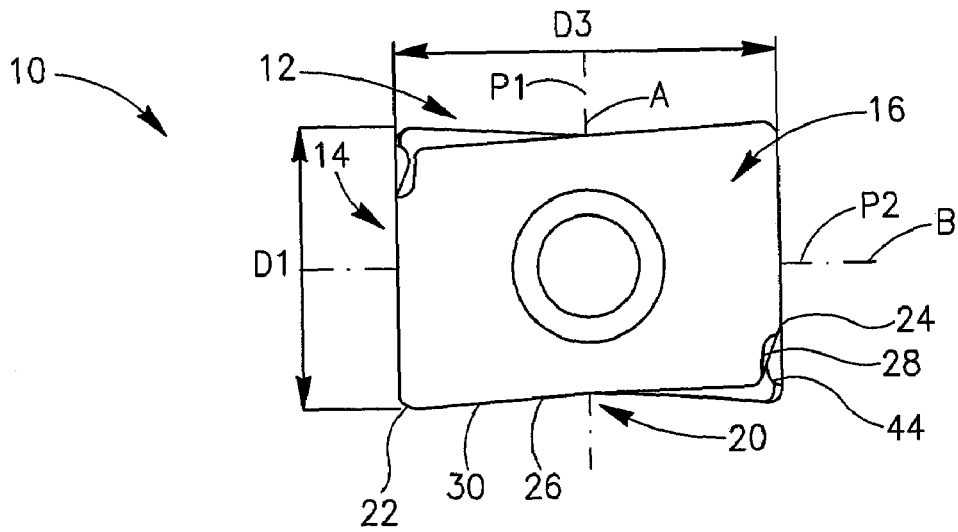
FIG. 2 is a top view of the milling cutting insert.
Figure 3:
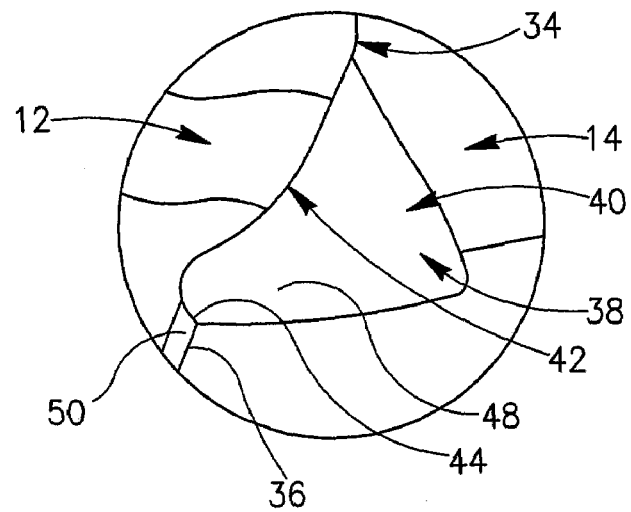
FIG. 3 is a detail of FIG. 1.

Attention is drawn to FIGS. 1 to 3 showing a tangential milling cutting insert 10 which is typically manufactured by form pressing and sintering carbide powders. Tangential cutting inserts also known as on-edge, or lay down, cutting inserts, are oriented in an insert pocket in such a manner that during a cutting operation the cutting forces are directed along a major (thicker) dimension of the cutting insert. It should be noted that directional terms appearing throughout the specification and claims, e.g. "forward", "rear", etc., (and derivatives thereof) are for illustrative purposes only, and are not intended to limit the scope of the appended claims.

The cutting insert 10 has a generally cuboid body and comprises two identical opposed end surfaces 12, two identical opposed minor surfaces 14 and two identical opposed major surfaces 16. The cutting insert 10 has a first dimension D1 measured between the end surfaces 12 that is greater than a second dimension D2 measured between the major surfaces 16. A third dimension D3 measured between the minor surfaces 14 is also greater than the second dimension D2.

The cutting insert 10 has a first axis A passing through the two end surfaces 12, a second axis B perpendicular to the first axis A and passing through the two minor surfaces 14 and a third axis C perpendicular to the first and second axes A, B and passing through the two major surfaces 16. The first and third axes A, C define a first plane P1, and the second and third axes B, C define a second plane P2. A through bore 18 extending between the major surfaces 16 has a bore axis that coincides with the third axis C. The cutting insert 10 has 180° rotational symmetry about each of the first, second and third axes A, B, C.

An intersection between each end surface 12 and each major surface 16 constitutes a major edge 20 which extends between a first 22 and second 24 limit. A first portion 26 of the major edge 20 extends away from the first limit 22 in the general direction of the second axis B. A second portion 28 of the major edge 20 merges with the first portion 26, and extends initially towards the second plane P2 and then away from the first plane P1 to the second limit 24. The first portion 26 of the major edge 20 constitutes a major cutting edge 30.

An intersection between each end surface 12 and each minor surface 14 is divided into a minor edge 32 and a rear edge 34. The minor edge 32 constitutes a minor cutting edge 36, and the rear edge 34 extends to the second limit 24 of an adjacent major edge 20. Two recesses 38, each having a recess face 40, are formed in each minor surface 14, each recess opening out into an adjacent end surface 12. Each recess face 40 and the adjacent end surface 12 intersect along a recessed edge 42 which forms part of the rear edge 34. At least a portion of the recessed edge 42 constitutes a rear cutting edge 44. The rear cutting edge 44 merges with the minor cutting edge 36 and extends therefrom towards the first plane P1 in the general direction of the second axis B. A corner cutting edge 46 is formed between each major cutting edge 30 and its adjacent minor cutting edge 36. Each rear cutting edge 44 has a rear relief face 48 and a rear rake face 50. The rear relief face 48 extends away from the rear cutting edge 44 towards the second plane P2 along a portion of its associated recess face 40. The rear rake face 50 extends away from the rear cutting edge 44 along a portion of its associated end surface 12. It is noted that the second portion 28 of each major edge 20, is closer to the first and second planes P1, P2, than an adjacent rear cutting edge 44. As a result, in a top view of the cutting insert 10 (see FIG. 2); one rear cutting edge 44 of each end surface 12 is not obscured by any part of the cutting insert 10.

Figure 4:
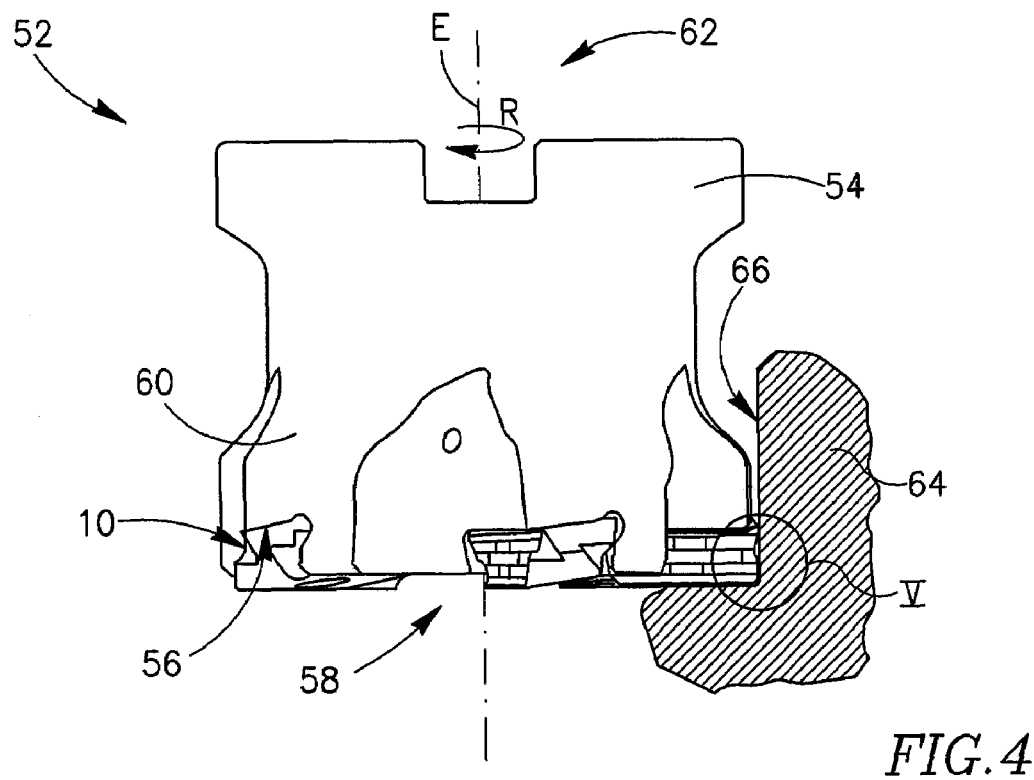
FIG. 4 is a side view of a plunge milling cutter, with milling cutting inserts according to the present invention mounted therein, illustrating one step of its rear cutting action.
Figure 5:
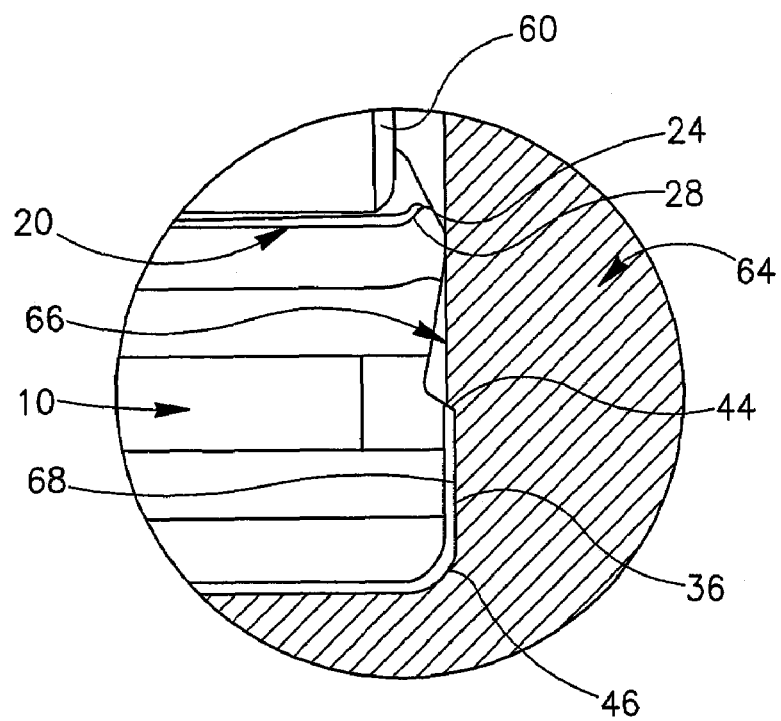
FIG. 5 is a detail of FIG. 4.

Attention is now drawn to FIGS. 4 and 5 showing a plunge milling cutter 52 having an axis of rotation E defining a direction of rotation R. The milling cutter 52 has a cutter body 54 which is provided with a plurality of insert pockets 56 on a forward end 58 thereof. Each insert pocket 56 opens out to a peripheral surface 60 of the cutter body 54 and has a cutting insert 10 in accordance with the present invention retained therein by means of a clamping screw (not shown). A rear end 62 of the cutter body 54 is designed to receive an adaptor having a long shank, or a shank extension, for deep plunging operations.

When mounted in the cutter body 54, each cutting insert 10 has adjacent its operative end surface 12, that is the end surface 12 facing the direction of rotation R, one operative rear cutting edge 44. The operative rear cutting edge 44 is located radially outwardly beyond the periphery 60 of the cutter body 54 and beyond any portion of the milling cutter 52.

During plunge milling operations in which the milling cutter 52 does not plunge fully into a workpiece 64, for example when plunging along an edge, or along the walls of a pre-existing pocket or cavity of the workpiece 64, the cutting forces acting on the milling cutter 52 are not balanced and as a result the milling cutter 52 is subjected to radial forces directed away from the workpiece 64. Due to these radial forces, the shank, or the shank extension, will develop an elastic deformation and bend away from the workpiece 64, and thereby form a slanted wall 66 on the workpiece 64 while advancing axially downwardly. The deeper the plunging, the greater the bending of the shank, therefore the slant of the workpiece 64 is greatest at the bottom of a milled portion of the workpiece 64, where the milling cutter 52 terminates its downstroke. Ideally, the plunged portion of the workpiece 64 should have a vertical surface. The material in the slanted wall 66 is superfluous material that deviates from the desired vertical surface. The cutting insert 10 of the present invention is capable of removing, or at least partially removing, the superfluous material.

On completion of the downstroke, the milling cutter 52 continues to rotate on the spot at the bottom of the milled portion before the upstroke commences. Whilst rotating on the spot, the elastic deformation that has accumulated in the shank will force the minor and corner cutting edges 36, 46 to penetrate radially into the slanted wall 66 of the workpiece 64 and thereby mill a depression 68 in the superfluous material. The milling cutter 52 is now moved axially upwardly (upstroke) during which the rear cutting edges 44 of the cutting inserts 10 remove superfluous material located axially above the depression 68 thereby "straightening out" the portion of the workpiece 64 milled during the downstroke.

Although the present invention has been described to a certain degree of particularity, it should be understood that various alterations and modifications could be made without departing from the scope of the invention as hereinafter claimed.

The invention claimed is:

1. A milling cutting insert (10) comprising:
   a pair of opposing end surfaces (12), a pair of opposing minor surfaces (14) and a pair of opposing major surfaces (16);
   each end surface (12) and major surface (16) intersect at a major edge (20), at least a portion of which forms a major cutting edge (30); and
   each end surface (12) and minor surface (14) intersect at a minor edge (32), at least a first portion of which forms a minor cutting edge (36) and at least a second portion of which forms a rear cutting edge (44); wherein:
   each rear cutting edge (44) merges with and is transverse to an adjacent minor cutting edge (36);

each rear cutting edge (44) has a rear relief face (48) that extends towards an opposite end surface (12);

each rear cutting edge (44) has a rear rake face (50) that extends along the associated end surface (12); and in a top view of the cutting insert (10), one rear cutting edge (44) of each end surface (12) is not obscured by any part of the cutting insert (10).

2. The milling cutting insert according to claim 1, wherein each major cutting edge (30) and adjacent minor cutting edge (36) merge at a corner cutting edge (46).

3. The milling cutting insert according to claim 1, wherein each end surface (12) has a 180° rotational symmetry about a first axis (A) that passes through both end surfaces (12).

4. The milling cutting insert according to claim 3, wherein each minor surface (14) has a 180° rotational symmetry about a second axis (B) that passes through both minor surfaces (14), the second axis (B) being perpendicular to the first axis (A).

5. The milling cutting insert according to claim 4, wherein each major surface (16) has a 180° rotational symmetry about a third axis (C) that passes through both major surfaces (16), the third axis (C) being perpendicular to both the first axis (A) and the second axis (B).

6. The milling cutting insert according to claim 5, wherein:

the first and third axes (A, C) define a first plane (P1), and the second and third axes (B, C) define a second plane (P2);

the rear cutting edge (44) extends from the minor cutting edge (36) towards the first plane (P1) in the general direction of the second axis (B); and the rear relief face (48) extends away from the rear cutting edge (44) towards the second plane (P2).

7. The milling cutting insert according to claim 1, wherein each minor surface (14) has a 180° rotational symmetry about a second axis (B) that passes through both minor surfaces (14).

8. The milling cutting insert according to claim 1, wherein each major surface (16) has a 180° rotational symmetry about a third axis (C) that passes through both major surfaces (16).

9. A milling cutter (52) comprising:

a cutter body (54) having a forward end (58), a rear end, a peripheral surface (60) and an axis of rotation extending between the forward and rear ends and defining a direction of rotation; and a plurality of insert pockets (56) formed on the forward end (58) and opening out to the peripheral surface (60) of the cutter body, each insert pocket retaining a milling cutting insert in accordance with claim 1.

10. The milling cutter according to claim 9, wherein each cutting insert is retained such that one of its major surfaces faces generally rearwardly, an operative end surface faces generally in the direction of rotation and an operative rear cutting edge, associated with the operative end surface, projects radially outwardly beyond the peripheral surface.

11. The milling cutter according to claim 10, wherein the operative rear cutting edge extends radially outwardly beyond any portion of the milling cutter.

12. A milling cutting insert (10) comprising:

a pair of opposing end surfaces (12), a pair of opposing minor surfaces (14) and a pair of opposing major surfaces (16);

each end surface (12) and major surface (16) intersect at a major edge (20), at least a portion of which forms a major cutting edge (30);

each end surface (12) and minor surface (14) intersect at a minor edge (32), at least a portion of which forms a minor cutting edge (36); and a first axis (A) passing through the two end surfaces (12), a second axis (B) perpendicular to the first axis (A) and passing through the two minor surfaces (14) and a third axis (C) perpendicular to the first and second axes (A, B) and passing through the two major surfaces (16), the first and third axes (A, C) define a first plane (P1), and the second and third axes (B, C) define a second plane (P2); wherein:

an intersection between each end surface (12) and each minor surface (14) also forms a rear edge (34) that extends towards an adjacent major edge (20);

at least a portion of the rear edge (34) constitutes a rear cutting edge (44) which merges with the minor cutting edge (36) and extends therefrom towards the first plane (P1) in the general direction of the second axis (B);

the rear cutting edge (44) has a rear relief face (48) which extends away from the rear cutting edge (44) towards the second plane (P2);

the rear cutting edge (44) has a rear rake face (50) which extends away from the rear cutting edge (44) along a portion of its associated end surface (12); and in a top view of the cutting insert (10), one rear cutting edge (44) of each end surface (12) is not obscured by any part of the cutting insert (10).

13. The milling cutting insert according to claim 12, wherein each major cutting edge (30) and adjacent minor cutting edge (36) merge at a corner cutting edge (46).

14. The milling cutting insert according to claim 12, wherein each end surface (12) has a 180° rotational symmetry about the first axis (A).

15. The milling cutting insert according to claim 14, wherein each minor surface (14) has a 180° rotational symmetry about the second axis (B).

16. The milling cutting insert according to claim 15, wherein each major surface (16) has a 180° rotational symmetry about the third axis (C).

17. The milling cutting insert according to claim 12, wherein each minor surface (14) has a 180° rotational symmetry about the second axis (B).

18. The milling cutting insert according to claim 12, wherein each major surface (16) has a 180° rotational symmetry about the third axis (C).

19. A milling cutter (52) comprising:

a cutter body (54) having a forward end (58), a rear end, a peripheral surface (60) and an axis of rotation extending between the forward and rear ends and defining a direction of rotation; and a plurality of insert pockets (56) formed on the forward end (58) and opening out to the peripheral surface (60) of the cutter body, each insert pocket retaining a cutting insert in accordance with claim 12.

20. The milling cutter according to claim 19, wherein each cutting insert is retained such that one of its major surfaces faces generally rearwardly, an operative end surface faces generally in the direction of rotation and an operative rear cutting edge, associated with the operative end surface, projects radially outwardly beyond the peripheral surface.

21. The milling cutter according to claim 20, wherein the operative rear cutting edge extends radially outwardly beyond any portion of the milling cutter.

* * * * *